(12) United States Patent
Kitamura et al.

(10) Patent No.: US 6,852,154 B2
(45) Date of Patent: Feb. 8, 2005

(54) INK SET

(75) Inventors: Kazuhiko Kitamura, Nagano (JP);
Hiroko Hayashi, Nagano (JP); Kyoichi Oka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 71 days.

(21) Appl. No.: 10/419,721

(22) Filed: Apr. 21, 2003

(65) Prior Publication Data

US 2004/0048745 A1 Mar. 11, 2004

(30) Foreign Application Priority Data

| Apr. 23, 2002 | (JP) | P.2002-120069 |
| Apr. 23, 2002 | (JP) | P.2002-120070 |
| Apr. 15, 2003 | (JP) | P.2003-109994 |

(51) Int. Cl.[7] .............................................. C09D 11/02
(52) U.S. Cl. .............................. 106/31.47; 106/31.48; 106/31.49; 106/31.52; 106/31.77; 106/31.78; 106/31.81
(58) Field of Search ................. 106/31.47, 31.48, 106/31.49, 31.52, 31.77, 31.78, 31.81; 347/100; 428/195.1

(56) References Cited

U.S. PATENT DOCUMENTS

| 6,454,844 B1 | * | 9/2002 | Kanaya | 106/31.48 |
| 6,761,759 B2 | * | 7/2004 | Oki et al. | 106/31.43 |
| 2003/0070580 A1 | * | 4/2003 | Blease et al. | 106/31.27 |
| 2004/0003754 A1 | * | 1/2004 | Ishibashi et al. | 106/31.47 |
| 2004/0134383 A1 | * | 7/2004 | Matsumoto et al. | 106/31.47 |

FOREIGN PATENT DOCUMENTS

| JP | 2000-256587 | * | 9/2000 |
| JP | 2000-290559 | | 10/2000 |
| JP | 2001-288392 | | 10/2001 |

* cited by examiner

Primary Examiner—Helene Klemanski
(74) Attorney, Agent, or Firm—Ladas & Parry

(57) ABSTRACT

The invention provides: an ink set comprising a yellow ink composition, a magenta ink composition, and a cyan ink composition, wherein the magenta ink composition contains as a colorant at least one member selected from compounds represented by the following formula (1) and salts thereof; and an ink set comprising two magenta ink compositions differing in color density, wherein the magenta ink composition having a lower color density contains as a colorant at least one member selected from compounds represented by the following formula (1) and salts thereof.

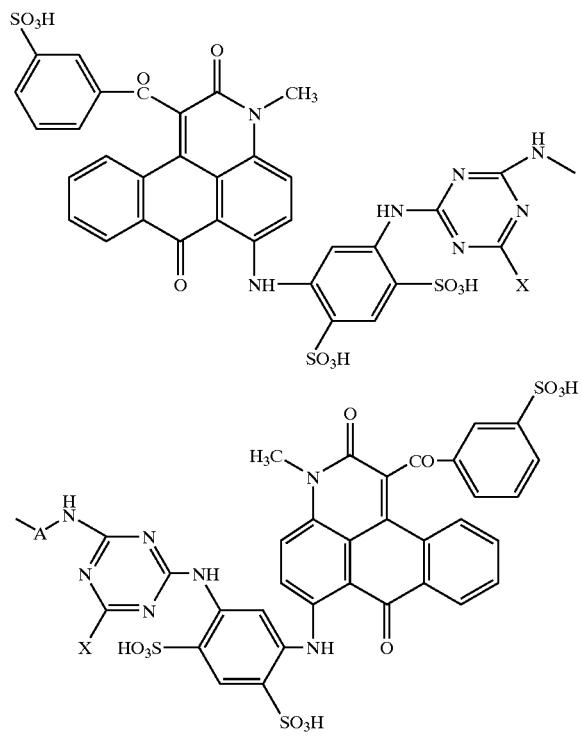

Also disclosed are: an ink cartridge housing the ink set; a process for recording with the ink set; and recorded matter obtained by recording with the ink set.

25 Claims, No Drawings

INK SET

FIELD OF THE INVENTION

The present invention relates to ink sets, more particularly, ink sets having satisfactory light resistance.

BACKGROUND OF THE INVENTION

Ink-jet recording processes are recently attracting attention. Ink-jet recording is a method of printing in which small droplets of an ink composition are ejected and adhered to a recording medium, e.g., paper, to conduct recording. This method is characterized in that high-resolution images of high quality can be printed at a high speed with a relatively inexpensive apparatus. Ink-jet recording apparatus, on which recording is conducted by this method, have found extensive commercial acceptance because of image quality, low cost, relatively quiet operation, and the ability to form graphic images. Of these, thermal (Bubble Jet (trademark)) and piezoelectric drop-on-demand printers have especially succeeded in the market and have been in wide use as printers for personal computers in offices and homes.

Recently, a technique has come to be used in which two or more color ink compositions are used to form color images by ink-jet printing. In general, color images are formed with inks of three colors composed of a yellow ink composition, a magenta ink composition, and a cyan ink composition or, in some cases, with inks of four colors which include a black ink composition besides these three ink compositions. There also are cases where inks of six colors which include a light-cyan ink composition and a light-magenta ink composition besides ink compositions of these four colors or inks of seven colors which further include a dark-yellow ink composition besides ink compositions of these six colors are used to form color images. Such ink compositions for use in forming color images each are required not only to give a satisfactory color by itself but also to give a satisfactory intermediate color when used in combination with other ink composition(s). The ink compositions are further required to give printed matters which do not suffer a color change or fading during storage.

In recent years, printed matter obtained by "photographic-image-quality" printing by color ink-jet printers have come to compare favorably with "silver salt photographs" as a result of continuous improvements in heads, ink compositions, recording methods, and media. Namely, ink-jet printing has become "comparable to photographs" in image quality. On the other hand, improvements in the storability of images obtained are being attempted by improving ink compositions and media. In particular, light resistance has been improved to such a level as to pose no practical problem (see patent documents 1 and 2 identified below). However, the light resistance has not reached the same level as that of silver salt photographs. In a standard method for evaluating light resistance, the degrees of fading of pure-color patterns respectively of Y, M, and C (optical density, around 1.0) are used as indexes for judgment. Among the ink compositions mounted on printers commercially available presently, the magenta ink compositions have the lowest light resistance when judged by the above-described evaluation method. This light resistance of magenta ink compositions, in many cases, governs the light resistance life of ink sets. Consequently, improving the light resistance of magenta ink compositions leads to an improvement in the light resistance of photographic images and to prolongation of the light resistance life of ink sets.

On the other hand, it has become possible to obtain images free from graininess by using an ink set including two ink compositions differing in color density. In such ink sets including two ink compositions differing in color density, which are intended mainly for photographic image printing, ink compositions having a low color density are generally used frequently for photographic image formation for the purpose of diminishing/eliminating graininess. With respect to the evaluation of light resistance described above, patterns having an optical density around 1.0 are ones formed from ink compositions having a low color density. Consequently, improving the light resistance of ink compositions having a low color density leads to an improvement in the light resistance of photographic images and prolongation of the light resistance life of ink sets. In addition, since ink composition having a high color density are also used in forming richly colored images or graphic-art-like patterns, improvements of these ink compositions are also useful.

Patent document 1: JP-A-2000-290559

Patent document 2: JP-A-2001-288392

SUMMARY OF THE INVENTION

The present invention has been made under the circumstances described above. Accordingly, an object of the invention is to provide an ink set capable of recording images having satisfactory light resistance.

Another object of the invention is to provide an ink cartridge housing the ink set, a process for recording with the ink set, and recorded matter obtained by recording with the ink set.

Other objects and effects of the invention will become apparent from the following description.

The present inventors made investigations in which combinations of various ink compositions of each color were used as ink sets and how images formed with these ink combinations changed with time was examined. As a result, they found that when a specific dye described later is used as a colorant for a magenta ink, this magenta ink has improved light resistance, and that when an ink set including this magenta ink is used for recording, the image obtained can have improved light resistance and a prolonged light resistance life. They further found that when the specific dye described later is used in an ink set including two magenta ink compositions differing in color density (hereinafter, the magenta ink composition having a higher color density is referred to as "dark-magenta ink composition", while the magenta ink composition having a lower color density is referred to as "light-magenta ink composition") as a colorant for the magenta ink compositions (especially for the light-magenta ink composition), then the magenta ink compositions (especially the light-magenta ink composition) have improved light resistance, and that images recorded with the ink set including the dark- and light-magenta inks, which differ in color density, can have improved light resistance and a prolonged light resistance life. The invention has been completed based on these findings.

1. The invention provides, according to a first aspect thereof, an ink set comprising a yellow ink composition, a magenta ink composition and a cyan ink composition, wherein the magenta ink composition contains as a colorant at least one member selected from compounds represented by the following formula (1) and salts thereof:

(1)

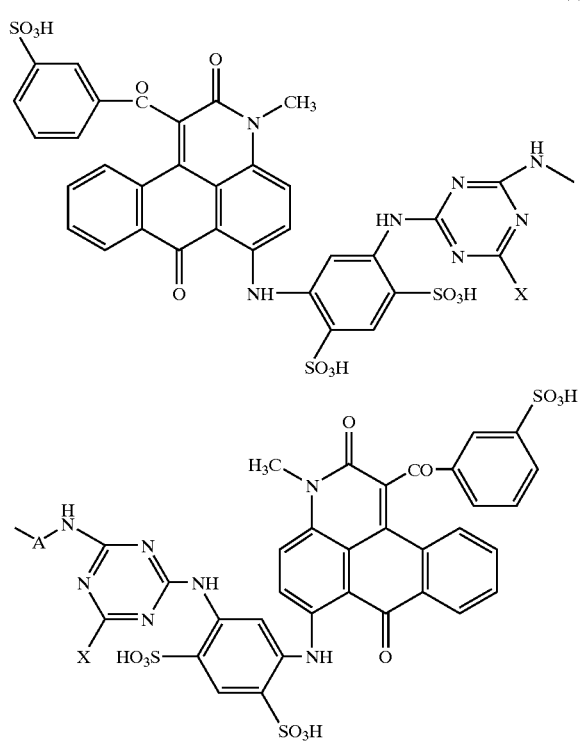

wherein A represents an alkylene group, an alkylene group having a phenylene group, or a group represented by

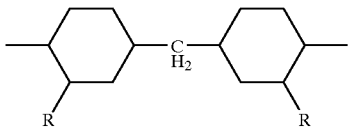

(wherein R means a hydrogen atom or an alkyl group) and X represents $NH_2$, OH or Cl.

2. In the ink set according to the first aspect of the invention, the magenta ink composition described in item 1 above preferably contains as a colorant the at least one member selected from compounds represented by formula (1) and salts thereof in a total amount of from 1.0 to 10% by weight based on the overall weight of the magenta ink composition.

3. The invention further provides, according to a second aspect thereof, an ink set comprising two magenta ink compositions differing in color density, wherein the magenta ink composition having a lower color density contains as a colorant at least one member selected from compounds represented by formula (1) and salts thereof.

4. In the ink set according to the second aspect of the invention, the magenta ink composition having a lower color density preferably contains as a colorant the at least one member selected from compounds represented by formula (1) and salts thereof in a total amount of from 0.5 to 3.5% by weight based on the overall weight of the magenta ink composition having a lower color density.

5. In the ink set according to the second aspect of the invention, the magenta ink composition having a higher color density preferably contains as a colorant at least one member selected from compounds represented by formula (1), salts thereof, and compounds represented by the following formula (2):

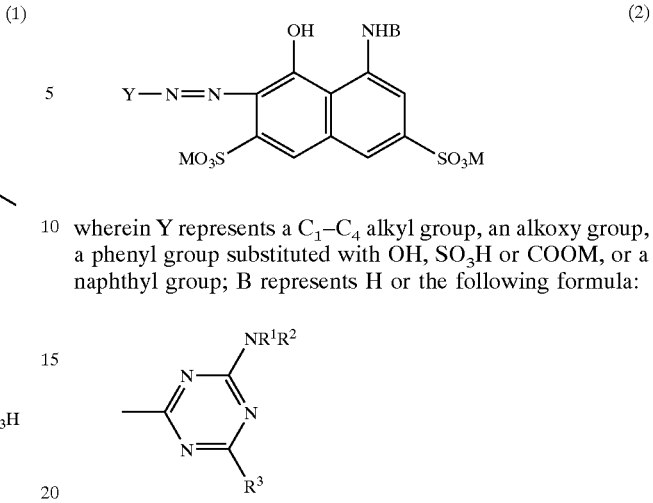

wherein Y represents a $C_1$–$C_4$ alkyl group, an alkoxy group, a phenyl group substituted with OH, $SO_3H$ or COOM, or a naphthyl group; B represents H or the following formula:

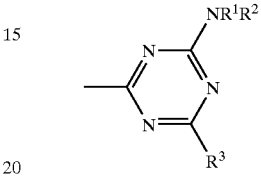

wherein $R^1$ represents H, OH, or a $C_1$–$C_4$ alkyl group substituted with COOH, $R^2$ represents a $C_1$–$C_4$ alkyl or phenyl group substituted with OH, $OCH_3$, $OC_2H_5$, $SO_3M$ or COOM, and $R^3$ represents OH, COOH or $NHR^4$, wherein $R^4$ represents $SO_3M$ or a $C_1$–$C_4$ alkyl group substituted with COOH; and M represents H, Li, Na, K, ammonium or an organic amine.

6. In the ink set according to the second aspect of the invention, the magenta ink composition having a higher color density preferably contains as a colorant the at least one member selected from compounds represented by formula (1), salts thereof, and compounds represented by formula (2) in a total amount of from 1 to 10% by weight based on the overall weight of the magenta ink composition having a higher color density.

7. The ink set according to the second aspect of the invention preferably includes a yellow ink composition and a cyan ink composition.

8. The ink set according to the invention preferably includes a yellow ink composition and two cyan ink compositions differing in color density.

9. In the ink sets according to the invention, the yellow ink composition preferably contains as a colorant at least one member selected from compounds represented by the following formula (3) and compounds represented by the following formula (4):

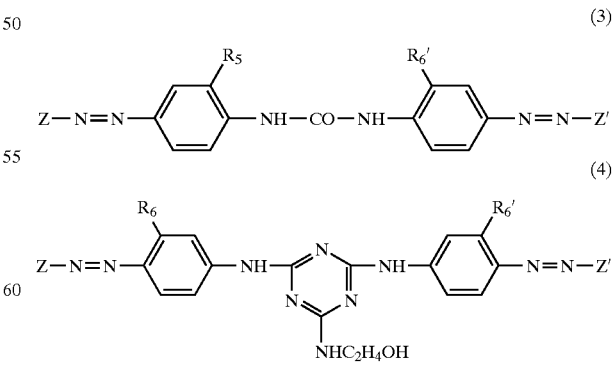

wherein $R_5$, $R_5'$, $R_6$, and $R_6'$ each independently represent $CH_3$ or $OCH_3$, and Z and Z' may be the same or different and each independently have any of the following structures:

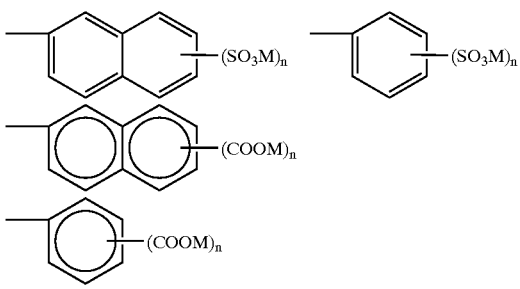

wherein M represents H, Li, Na, K, ammonium or an organic amine, and n is an integer of 1 or 2.

10. In the ink sets according to the invention, the yellow ink composition preferably contains as a colorant the at least one member selected from compounds represented by formula (3) and compounds represented by formula (4) in a total amount of from 1 to 6% by weight based on the overall weight of the yellow ink composition.

11. The ink sets according to the invention preferably include two yellow ink compositions differing in density.

12. In the ink set of the invention, the cyan ink composition having a higher color density, of the two cyan ink compositions differing in color density mentioned in item 8 above, preferably contains as a colorant at least one member selected from compounds represented by the following formula (5):

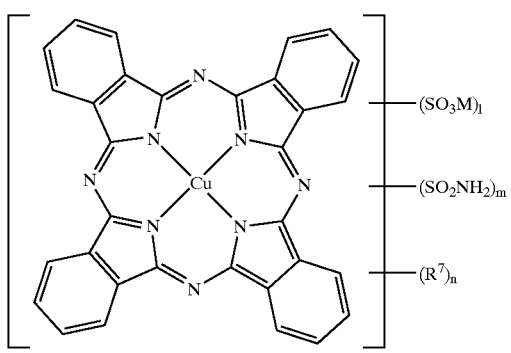

wherein $R^7$ represents OH or COOH; M represents H, Li, Na, K, an ammonium group or an organic amine; and l, m and n each are from 0 to 4, provided that (l+m+n)=4.

13. In the ink set according to the invention, the cyan ink composition having a lower color density, of the two cyan ink compositions differing in color density mentioned in item 8 above, preferably contains as a colorant at least one member selected from compounds represented by formula (5).

14. In the ink set according to the invention, the cyan ink composition having a higher color density, of the two cyan ink compositions differing in color density mentioned in item 8 above, preferably contains the at least one member selected from compounds represented by formula (5) as a colorant in a total amount of from 2.0 to 6.0% by weight based on the overall weight of the cyan ink composition having a higher color density, and the cyan ink composition having a lower color density preferably contains the at least one member selected from compounds represented by formula (5) as a colorant in a total amount of from 0.4 to 3.0% by weight based on the overall weight of the cyan ink composition having a lower color density.

15. In the ink set according to the invention, the cyan ink composition mentioned in item 1 above preferably contains as a colorant at least one member selected from compounds represented by the following formula (5) in a total amount of from 2.0 to 6.0% by weight.

16. The ink sets according to the invention preferably include a black ink composition.

17. In the ink sets according to the invention, the ink compositions described in any one of items 1 to 16 above preferably contain a nonionic surfactant.

18. In the ink sets according to the invention, the nonionic surfactant mentioned in item 17 above is preferably an acetylene glycol-based surfactant.

19. In the ink sets according to the invention, each ink composition preferably contains the nonionic surfactant mentioned in item 17 or 18 above in an amount of from 0.1 to 5% by weight based on the overall weight of the ink composition.

20. In the ink sets according to the invention, the ink compositions described in any one of items 1 to 19 above preferably contain a penetration accelerator.

21. In the ink sets according to the invention, the penetration accelerator mentioned in item 20 above is preferably a glycol ether.

22. The invention further provides an ink cartridge housing the ink set described in any one of items 1 to 21 above either integrally or independently.

23. The invention furthermore provides an ink-jet recording process which comprises conducting recording with the ink set described in any one of items 1 to 21 above or with the ink cartridge described in item 22 above.

24. The invention still further provides recorded matter obtained by recording with the ink set described in any one of items 1 to 21 above or with the ink cartridge described in item 22 above.

DETAILED DESCRIPTION OF THE INVENTION

The ink set according to the first aspect of the invention basically comprises a yellow ink composition, a magenta ink composition, and a cyan ink composition, and has a feature that at least one member selected from compounds represented by formula (1) and salts thereof is used as a colorant for the magenta ink composition. This ink set may further include a light-magenta ink composition and a light-cyan ink composition according to need.

The ink set according to the second aspect of the invention comprises two magenta ink compositions differing in color density, and has a feature that the light-magenta ink composition contains as a colorant at least one member selected from compounds represented by formula (1) and salts thereof.

The ink set according to the second aspect of the invention is based on use of two magenta ink compositions, i.e., a dark-magenta ink composition and a light-magenta ink composition containing a specific colorant, in combination with a yellow ink composition and a cyan ink composition. According to need, this ink set can include two cyan ink compositions differing in color density (hereinafter, the cyan ink composition having a higher color density is referred to as "dark-cyan ink composition" and the cyan ink composition having a lower color density is referred to as "light-cyan ink composition").

The ink sets of the invention can further include a dark-yellow ink composition and a black ink composition.

The ink sets of the invention each are for use in recording techniques in which ink compositions are used. Examples of the recording techniques using ink compositions include ink-jet recording, recording with a writing utensil, e.g., a pen, and other various printing techniques. The ink compositions according to the invention are preferably used in ink-jet recording.

In the ink set according to the first aspect of the invention, the colorant for use in the magenta ink composition comprises at least one member selected from compounds represented by formula (1) (including salts thereof; the same applies hereinafter). In the ink set according to the second aspect of the invention, the colorant for use in at least the light-magenta ink composition comprises at least one member selected from compounds represented by formula (1).

Although the compounds represented by formula (1) may be produced by any method, they can be produced, for example, by the following process.

1) Ethyl benzoylacetate is reacted with 1-methylamino-4-bromoanthraquinone in a solvent to obtain 1-benzoyl-6-bromo-2,7-dihydro-3-methyl-2,7-dioxo-3H-dibenzo[f,ij]isoquinoline.

2) Subsequently, the compound obtained in 1) above is reacted with m-aminoacetanilide in a solvent to obtain 3'-[1-benzoyl-2,7-dihydro-3-methyl-2,7-dioxo-3H-dibenzo[f,ij]isoquinolin-6-ylamino]acetanilide.

3) The compound obtained in 2) above is reacted in fuming sulfuric acid to obtain trisodium 6-amino-4-[2,7-dihydro-3-methyl-1-(3-sulfonatobenzoyl)-2,7-dioxo-3H-dibenzo[f,ij]isoquinolin-6-ylamino]benzene-1,3-disulfonate.

4) The compound obtained in 3) above is reacted with cyanuric chloride in water to obtain a primary condensate, which is reacted with a diamine having a connecting group A to obtain a secondary condensate.

5) The compound obtained in 4) above, which itself may be a compound represented by formula (1) as a target compound, may be hydrolyzed or reacted with ammonia to obtain a third condensate as a target compound represented by formula (1).

The colorant to be used in the magenta ink composition in the ink set according to the first aspect of the invention (or for use in at least the light-magenta ink composition in the case of the ink set according to the second aspect of the invention) may comprise one member selected from compounds represented by formula (1) or may comprise two or more members selected therefrom.

The magenta ink composition (or at least the light-magenta ink composition in the case of the ink set according to the second aspect), which contains at least one member selected from compounds represented by formula (1), is superior in light resistance to magenta ink compositions containing conventionally used magenta dyes.

In the ink set according to the first aspect of the invention, the colorant concentration in the magenta ink composition can be suitably selected according to the color value of the compound(s) represented by formula (1) to be used as a colorant. However, it is generally preferred that the ink composition contains at least one compound represented by formula (1) in a total amount of from 1.0 to 10% by weight. When the colorant concentration in the ink composition is 1.0% by weight or higher, coloring properties can be secured. When the colorant concentration therein is 10% by weight or lower, it is easy to secure properties required for ink-jet ink compositions and reliability, e.g., non-clogging properties.

In the case of the ink set according to the second aspect of the invention, the colorant concentration in the light-magenta ink composition can be suitably selected according to the color value of the compound(s) represented by formula (1) to be used as a colorant. However, it is generally preferred that the ink composition contains at least one compound represented by formula (1) in a total amount of from 0.5 to 3.5% by weight. When the colorant concentration in the ink composition is 0.5% by weight or higher, coloring properties can be secured. When the colorant concentration therein is 3.5% by weight or lower, graininess can be diminished/eliminated.

The colorant to be used in the dark-magenta ink composition in the ink set according to the second aspect of the invention may comprise one member selected from the group consisting of compounds represented by formula (1) and compounds represented by formula (2) or may comprise two or more members selected therefrom. The dark-magenta ink composition containing at least one compound represented by formula (1) is superior in light resistance to dark-magenta ink compositions containing conventionally used magenta dyes.

The colorant concentration in this dark-magenta ink composition can be suitably selected according to the color value of the compound(s) represented by formulae (1) and the compound(s) represented by formula (2) to be used as a colorant. However, it is generally preferred that at least one compound selected from the group consisting of compounds represented by formula (1) and compounds represented by formula (2) be contained in the composition in a total amount of from 1.0 to 10% by weight. When the colorant concentration in the ink composition is 1.0% by weight or higher, coloring properties can be secured. When the colorant concentration therein is 10% by weight or lower, it is easy to secure properties required for ink-jet ink compositions and reliability, e.g., non-clogging properties.

One or more other magenta dyes also can be used in the magenta ink composition in the first aspect (or in the dark- and light-magenta ink compositions in the ink set according to the second aspect) for the purpose of regulating color tone, etc., as long as the incorporation thereof does not considerably impair light resistance. The magenta dyes usable in the second aspect of the invention besides the compounds represented by formula (1) and the compounds represented by formula (2) are not particularly limited. However, preferred examples thereof include the compound represented by the following formula (6).

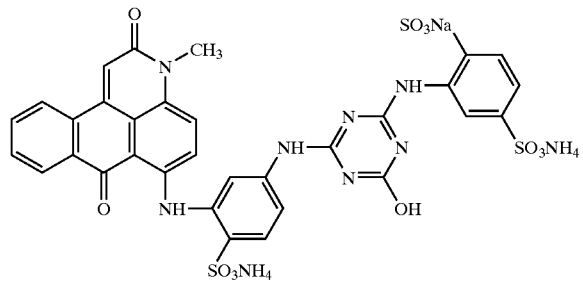

(6)

Other examples of the magenta dyes other than the compounds represented by formula (1) (or other than the compounds represented by formula (1) and the compounds represented by formula (2) in the case of the ink set according to the second aspect of the invention) include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, and 247, C.I. Direct Violet 7, 9, 47, 48, 51, 66, 90, 93, 94, 95, 98, 100, and 101, C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, and 397, C.I. Acid Violet 5, 34, 43, 47, 48, 90, 103, and 126, C.I. Reactive Red 3, 13, 17, 19, 21, 22, 23, 24, 29, 35, 37, 40, 41, 43, 45, 49, and 55, C.I. Reactive Violet 1, 3, 4, 5, 6, 7, 8, 9, 16, 17, 22, 23, 24, 26, 27, 33, and 34, C.I. Basic Red 12, 13, 14, 15, 18, 22, 23, 24, 25, 27, 29, 35, 36, 38, 39, 45, and 46, and C.I. Basic Violet 1, 2, 3, 7, 10, 15, 16, 20, 21, 25, 27, 28, 35, 37, 39, 40, and 48.

As the colorant contained in the yellow ink composition to be used in the invention, any yellow colorant can be used. However, from the standpoint of enabling the ink sets to retain satisfactory light resistance, it is preferred that the yellow ink composition contains as a colorant at least one member selected from the group consisting of compounds represented by formula (3) and compounds represented by formula (4).

The colorant to be contained in the yellow ink composition in the invention may comprise one member selected from the group consisting of compounds represented by formula (3) and compounds represented by formula (4), or may comprise two or more members selected therefrom.

The colorant concentration in the yellow ink composition can be suitably selected according to the color value of the compound(s) selected from compounds represented by formula (3) and compounds represented by formula (4) to be used as a colorant. However, it is generally preferred that the ink composition contains at least one compound selected from the group consisting of compounds represented by formula (3) and compounds represented by formula (4) in a total amount of from 1.0 to 6.0% by weight. When the colorant concentration in the ink composition is 1.0% by weight or higher, coloring properties can be secured. When the colorant concentration therein is 6% by weight or lower, it is easy to secure properties required for ink-jet ink compositions and reliability, e.g., non-clogging properties.

One or more other yellow dyes also can be used in the invention for the purpose of regulating, e.g., the color tone of the yellow ink composition, as long as the incorporation thereof does not considerably impair light resistance.

The yellow dyes other than the compounds represented by formula (3) and the compounds represented by formula (4) are not particularly limited. Examples thereof include C.I. Direct Yellow 8, 9, 11, 12, 27, 28, 29, 33, 35, 39, 41, 44, 50, 53, 58, 59, 68, 87, 93, 95, 96, 98, 100, 106, 108, 109, 110, 130, 142, 144, 161, and 163, C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227, C.I. Reactive Yellow 2, 3, 13, 14, 15, 17, 18, 23, 24, 25, 26, 27, 29, 35, 37, 41, and 42, and C.I. Basic Yellow 1, 2, 4, 11, 13, 14, 15, 19, 21, 23, 24, 25, 28, 29, 32, 36, 39, and 40.

The ink sets of the invention preferably include a cyan ink composition having a high color density (dark-cyan ink composition). In particular, the ink set according to the second aspect of the invention preferably includes two cyan ink compositions differing in color density (dark- and light-cyan ink compositions).

As the colorant for the cyan ink composition in the ink sets of the invention (or for the dark- and light-cyan ink compositions in the case of the ink set including two cyan ink compositions differing in color density), any cyan colorant can be used. However, from the standpoint of enabling the ink sets to retain satisfactory light resistance, it is preferred that the cyan ink composition contains as a colorant at least one member selected from compounds represented by formula (5).

The colorant to be used in the cyan ink composition in the ink sets of the invention (or in the dark- and light-cyan ink compositions in the case of the ink set including two cyan ink compositions differing in color density) may comprise one member selected from compounds represented by formula (5), or may comprise two or more members selected therefrom.

The colorant concentration in the cyan ink composition in the ink sets of the invention (or in the dark- and light-cyan ink compositions in the case of the ink set including two cyan ink compositions differing in color density) can be suitably selected according to the color value of the compound(s) represented by formula (5) to be used as a colorant. However, it is generally preferred that the ink composition contains at least one compound represented by formula (5) in a total amount of from 2.0 to 6.0% by weight. When the colorant concentration in the ink composition is 2.0% by weight or higher, coloring properties can be secured. When the colorant concentration therein is 6.0% by weight or lower, it is easy to secure properties required for ink-jet ink compositions and reliability, e.g., non-clogging properties.

In the case of the ink set including two cyan ink compositions differing in color density, the colorant concentration in the light-cyan ink composition can be suitably selected according to a color balance for a combination of the compound(s) represented by formula (5) to be used as a colorant and the dark-cyan ink composition described above. However, it is generally preferred that the ink composition contains at least one compound represented by formula (5) in a total amount of from 0.4 to 3.0% by weight. When the colorant concentration in the ink composition is 0.4% by weight or higher, coloring properties can be secured. When the colorant concentration therein is 3% by weight or lower, graininess can be diminished/eliminated.

One or more other cyan dyes also can be used for the purpose of regulating, e.g., the color tone of the cyan ink composition in the ink sets of the invention (or of the dark- and light-cyan ink compositions in the case of the ink set including two cyan ink compositions differing in color density), as long as the incorporation thereof does not considerably impair light resistance.

The cyan dyes other than the compounds represented by formula (5) are not particularly limited. Examples thereof include C.I. Direct Blue 1, 10, 15, 22, 25, 55, 67, 68, 71, 76, 77, 78, 80, 84, 90, 98, 106, 108, 109, 151, 156, 158, 159, 160, 168, 189, 192, 193, 194, 200, 201, 202, 203, 207, 211, 213, 214, 218, 225, 229, 236, 237, 244, 248, 249, 251, 252, 264, 270, 280, 288, 289, and 291, C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, and 326, C.I. Reactive Blue 2, 3, 5, 8, 10, 13, 14, 15, 17, 18, 19, 21, 25, 26, 27, 28, 29, and 38, and C.I. Basic Blue 1, 3, 5, 7, 9, 22, 26, 41, 45, 46, 47, 54, 57, 60, 62, 65, 66, 69, and 71.

The ink sets of the invention can include a black ink composition according to need.

The colorant to be used in the black ink composition is not particularly limited, and any dye or pigment capable of black printing can be used.

As such colorants can be used various dyes for use in ordinary inks, in particular, ink-jet recording inks. Examples thereof include direct dyes, acid dyes, dyes for foods, basic dyes, disperse dyes, vat dyes, soluble vat dyes, and reactive dyes. Furthermore, usable pigments include black pigments such as carbon black.

The black ink composition to be used in the invention preferably is a water-based ink composition from the standpoint of problems concerning safety, etc.

The colorant to be contained in the black ink composition in the invention can comprise a single member or a mixture of two or more members.

The ink compositions in the invention each preferably employ, as the main solvent, either water or a mixture of water and one or more water-soluble organic solvents.

As the water can be used ion-exchanged water, water purified by ultrafiltration or reverse osmosis, distilled water, or the like. From the standpoint of long-term storage, it is preferred to use water which has undergone any of various chemical sterilization treatments such as ultraviolet irradiation and addition of hydrogen peroxide.

In the case where water is used as the main solvent in each of the ink compositions in the invention, the content of water is preferably from 40 to 90% by weight, more preferably from 50 to 80% by weight, based on the overall weight of the ink composition.

The ink compositions in the invention can further contain at least one humectant selected from water-soluble organic solvents having a lower vapor pressure than pure water and from saccharides.

When the ink compositions containing a humectant are used in ink-jet recording, the inks can be inhibited from suffering water evaporation and be kept moist. Use of a water-soluble organic solvent is effective in improving ejection stability and in easily modifying viscosity without changing ink characteristics.

The term "water-soluble organic solvent" means a medium having the ability to dissolve solutes therein. The water-soluble organic solvent is selected from water-soluble solvents which are organic and have a lower vapor pressure than water. Desirable examples thereof include polyhydric alcohols such as ethylene glycol, propylene glycol, butanediol, pentanediol, 2-butene-1,4-diol, 2-methyl-2,4-pentanediol, glycerol, 1,2,6-hexanetriol, diethylene glycol, triethylene glycol, and dipropylene glycol, ketones such as acetonylacetone, esters such as γ-butyrolactone and triethyl phosphate, furfuryl alcohol, tetrahydrofurfuryl alcohol, and thiodiglycol.

Preferred examples of the saccharides include maltitol, sorbitol, gluconolactone, and maltose.

It is preferred that the humectant be added in an amount of from 5 to 50% by weight, preferably from 5 to 30% by weight, more preferably from 5 to 20% by weight, based on the overall weight of the ink composition. When the humectant content in each ink composition is 5% by weight or higher, humectant properties are obtained. When the humectant content therein is 50% by weight or lower, it is easy to regulate the ink composition so as to have a viscosity suitable for ink-jet recording.

The ink compositions in the invention preferably contain a nonionic surfactant as an additive effective in obtaining rapid ink fixation (penetrativity) and in simultaneously maintaining the roundness of each dot.

Examples of the nonionic surfactant to be used in the invention include acetylene glycol-based surfactants. Specific examples of the acetylene glycol-based surfactants include Surfynol 465, Surfynol 104, and Olfin STG (trade names; all manufactured by Nisshin Chemical Industry Co., Ltd.). The amount of the nonionic surfactant to be added is generally from 0.1 to 5% by weight, preferably from 0.5 to 2% by weight. When a nonionic surfactant is added in an amount of 0.1% by weight or larger, sufficient penetrativity is obtained. When a nonionic surfactant is added in an amount of 5% by weight or smaller, image blurring is easy to prevent.

Addition of a glycol ether as a penetration accelerator in combination with a nonionic surfactant is effective in enhancing penetrativity and in diminishing bleeding at the boundary between adjacent color inks in color printing. Thus, highly clear images can be obtained.

Examples of glycol ethers usable in the invention include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether, and triethylene glycol monobutyl ether. The amount of the glycol ether to be added is generally from 3 to 30% by weight, preferably from 5 to 15% by weight. When a glycol ether is added in an amount of 3% by weight or larger, a sufficient bleeding inhibitive effect is obtained. When a glycol ether is added in an amount of 30% by weight or smaller, it is easy to prevent image blurring and to secure ink storage stability.

Other additives such as a pH regulator, e.g., triethanolamine or an alkali metal hydroxide, water-soluble polymer, e.g., sodium alginate, water-soluble resin, fluorochemical surfactant, fungicide, and rust preventive may be added to the ink compositions in the invention according to need.

Examples of the antiseptic or fungicide include sodium benzoate, sodium pentachlorophenolate, sodium salt of 2-pyridinethiol-1-oxide, sodium sorbate, sodium dehydroacetate, and 1,2-dibenzothiazolin-3-one (Proxel CRL, Proxel BDN, Proxel GXL, Proxel XL-2, and Proxel TN, manufactured by ICI Ltd.).

Examples of the pH regulator or of dissolution aids or antioxidants include amines such as diethanolamine, triethanolamine, propanolamine, and morpholine and modifications of these, metal hydroxides such as potassium hydroxide, sodium hydroxide, and lithium hydroxide, ammonium salts such as ammonium hydroxide and quaternary ammonium hydroxides (e.g., tetramethylammonium), carbonates such as potassium carbonate, sodium carbonate, and lithium carbonate, phosphates, pyrrolidone compounds such as N-methyl-2-pyrrolidone and 2-pyrrolidone, urea compounds such as urea, thiourea, and tetramethylurea, allophanates such as allophanate and methyl allophanate, buret compounds such as buret, dimethylburet, and tetramethylburet, and L-ascorbic acid and salts thereof.

In each of the ink compositions according to the invention, the optional ingredients enumerated above may be used alone. Alternatively, two or more optional ingredients selected from one or more of the groups may be used in combination.

In preparing each ink composition for use in the invention, it is preferred that the amounts of all ingredients for the ink composition be selected so that the ink composition comes to have a viscosity lower than 10 mPa·s at 20° C.

The surface tension of each ink composition in the invention as measured at 20° C. is 45 mN/m or lower, preferably in the range of from 25 to 45 mN/m.

Examples of methods for preparing each ink composition to be used in the invention include a method in which the ingredients are sufficiently mixed and dissolved and the resultant mixture is filtered under pressure through a membrane filter having an opening diameter of 0.8 µm and then degassed with a vacuum pump to prepare the ink composition.

An explanation is then given on the recording process of the invention, in which use is made of an ink set comprising ink compositions described above or an ink cartridge housing the ink set either integrally or independently. The recording process of the invention especially preferably is an ink-jet recording process in which ink compositions are ejected as droplets from minute openings and the droplets are adhered to a recording medium to conduct recording. However, it is a matter of course that the ink compositions according to the invention are usable also in applications such as recording with general writing utensils, recorders, pen plotters, or the like.

For practicing the ink-jet recording process, any of the known ink-jet recording systems can be used. In particular, excellent image recording can be attained by a system in which droplets are ejected based on oscillations caused by piezoelectric elements (recording system employing ink-jet heads which form ink composition droplets based on mechanical deformations caused by electrostrictive elements) or by a system utilizing thermal energy.

The invention will be illustrated in greater detail with reference to the following Examples and Comparative Examples, but the invention should not be construed as being limited thereto.

EXAMPLES 1 TO 3 AND COMPARATIVE EXAMPLE 1

[Preparation of Ink Compositions]

According to each of the formulations shown in Table 1, the ingredients were stirred together at ordinary temperature for 30 minutes. The resultant mixture was filtered through a 1-μm membrane filter. Thus, ink compositions respectively having the formulations shown in Table 1 were obtained. In Table 1, the amounts of the ingredients for each ink are given in terms of % by weight based on the overall weight of the ink.

The ink compositions shown in Table 1 are as follows.

M, M1, and M2 each indicate a magenta ink composition, Y1 and Y2 each indicate a yellow ink composition, and C1 and C2 each indicate a cyan ink composition. M is a magenta ink composition containing a conventional magenta dye, and M1 and M2 are magenta ink compositions containing a compound represented by formula (1) according to the invention.

TABLE 1

|  | M | M1 | M2 | C1 | C2 | Y1 | Y2 |
| --- | --- | --- | --- | --- | --- | --- | --- |
| M dye 1 |  | 5 | 2 |  |  |  |  |
| M dye 2 | 2.5 |  | 1.5 |  |  |  |  |
| C.I. Direct Blue 199 |  |  |  | 3.5 |  |  |  |
| C.I. Acid Blue 9 |  |  |  |  | 3.5 |  |  |
| C.I. Direct Yellow 86 |  |  |  |  |  | 0.8 |  |
| C.I. Direct Yellow 173 |  |  |  |  |  | 3 |  |
| C.I. Acid Yellow 23 |  |  |  |  |  |  | 1.5 |
| TEGmBE | 10 | 10 | 10 | 10 | 10 | 9 |  |
| Triethylene glycol |  | 5 | 5 | 6 |  | 9 |  |
| Diethylene glycol | 9 |  |  |  | 10 |  | 10 |
| Glycerol | 10 | 10 | 10 | 10 | 10 | 10 | 10 |
| Olfin 1010 | 1.5 | 1.5 | 1.5 | 1.5 | 1.5 |  |  |
| Olfin STG |  |  |  |  |  | 0.8 | 0.8 |

TABLE 1-continued

|  | M | M1 | M2 | C1 | C2 | Y1 | Y2 |
| --- | --- | --- | --- | --- | --- | --- | --- |
| Triethanolamine | 0.6 | 0.6 | 0.6 | 0.6 | 0.6 |  | 0.6 |
| Urea | 3.5 |  | 2 |  |  |  |  |
| 2-Pyrrolidone |  | 3 | 3 | 3 |  |  |  |
| Benzotriazole | 0.01 | 0.01 | 0.01 | 0.01 | 0.01 | 0.01 | 0.01 |
| Proxel XL-2 | 0.3 | 0.3 | 0.3 | 0.3 | 0.3 | 0.3 | 0.3 |
| EDTA | 0.02 | 0.02 | 0.02 | 0.02 | 0.02 | 0.02 | 0.02 |
| Ultrapure water | bal-ance | bal-ance | bal-ance | bal-ance | bal-ance | bal-ance | bal-ance |

The colorants used in these Examples and shown in Table 1 included the following. The compound represented by the following formula (7), which is referred to as M dye 1, was used as an example of the compounds represented by formula (1).

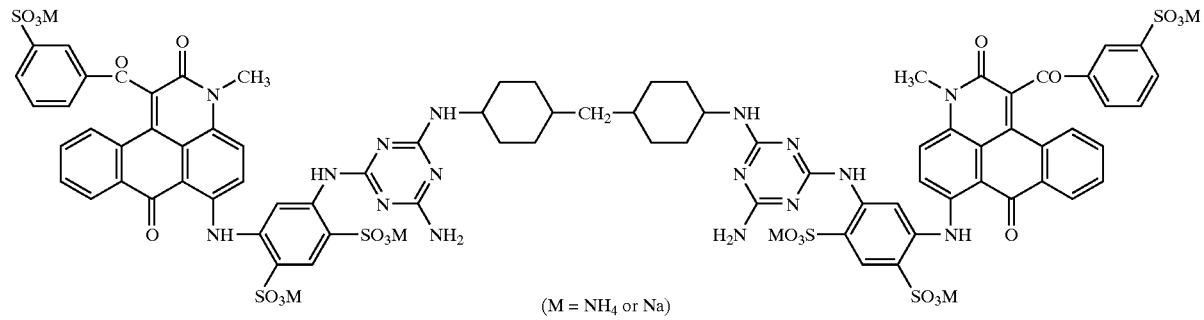

(M = NH$_4$ or Na)

(7)

The compound represented by the following formula (8), which is referred to as M dye 2, was used as an example of conventional magenta dyes.

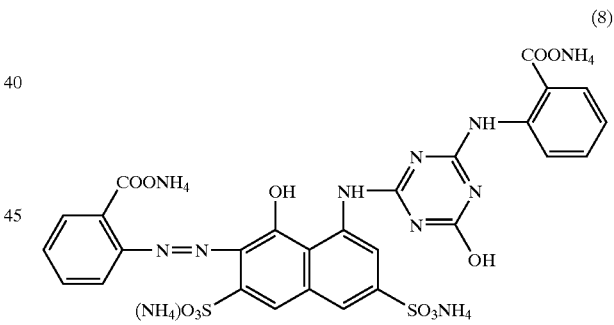

(8)

C.I. Direct Yellow 173 and C.I. Direct Yellow 86 were used as examples of the compounds represented by formula (3) and the compounds represented by formula (4), respectively. Furthermore, C.I. Direct Blue 199 was used as an example of the compounds represented by formula (5).

[Production of Printed Matter]

Subsequently, the inks obtained were used as ink sets according to the respective ink combinations shown below. These ink sets were filled in cartridges for exclusive use in ink-jet printer Stylus Color 880 (manufactured by Seiko Epson Corp.) to conduct printing with the printer on a recording medium for exclusive use in ink-jet printing (PM Photographic Paper; manufactured by Seiko Epson Corp.). Thus, recorded matters of two kinds were produced, i.e., color patches which were to be subjected to a light resistance test at a low color density and which bore a yellow image (Y image 1), magenta image (M image 1), and cyan image (C image 1) each printed so as to have an OD value in the range of from 0.9 to 1.1; and color patches which were to be subjected to a light resistance test at a high color density and which bore a yellow image (Y image 2), magenta image (M image 2), and cyan image (C image 2) each printed so as to have a maximum color density.

Example 1 . . . Y1, M1, C1
Example 2 . . . Y1, M2, C1
Example 3 . . . Y2, M1, C2
Comparative Example 1 . . . Y1, M, C1

With respect to each ink set, the two kinds of color patches as described above were produced and subjected to a fluorescent light resistance test.

Fluorescent Light Resistance Test

Fluorescent light resistance tester SFT-II (manufactured by Suga Test Instruments Co., Ltd.) was used to expose four samples of each recorded matter at an illuminance of 70,000 lux under the conditions of 24° C. and 60% RH for 7 days, 14 days, 21 days, or 28 days.

Light Resistance Evaluation at Low Color Density

Five samples of each color patch bearing a yellow image (Y image 1), magenta image (M image 1), and cyan image (C image 1) each printed so as to have an OD value in the range of from 0.9 to 1.1 were examined with a reflection densitometer ("Spectrolino" manufactured by Gretag) to measure values of OD (optical density) including the initial value thereof. The found values were introduced into the following equation to thereby obtain the relict optical density (ROD) after fading.

$$ROD\ (\%) = (D_n/D_0) \times 100$$

$D_n$: OD after exposure test (n=1 to 4)
$D_0$: OD before exposure test

An approximate curve for each image was determined by plotting the periods of exposure (number of days) as abscissa and the values of ROD as ordinate. From the approximate equation obtained, the period required for ROD to decrease to 70% was determined. Fluorescent light resistance was evaluated based on the following criteria, and the results thereof are shown in Table 2. The rating which governed the life of each ink set (the rating of the image having lowest light resistance) was taken as the life of the ink set.

A: ROD does not decrease to 70% in 25 days.
B: The period required for ROD to decrease to 70% is longer than 20 days but not longer than 25 days.
C: The period required for ROD to decrease to 70% is longer than 15 days but not longer than 20 days.
D: The period required for ROD to decrease to 70% is longer than 10 days but not longer than 15 days.
E: The period required for ROD to decrease to 70% is longer than 5 days but not longer than 10 days.

TABLE 2

|  | Pure Color, OD 1.0 | | | |
| --- | --- | --- | --- | --- |
|  | C | M | Y | Life |
| Example 1 | A | B | A | B |
| Example 2 | A | C | A | C |
| Example 3 | D | B | C | D |
| Comparative Example 1 | A | E | A | E |

Light Resistance Evaluation at High Color Density

Five samples of each color patch bearing a yellow image (Y image 2), magenta image (M image 2), and cyan image (C image 2) each printed so as to have a maximum color density were examined with a reflection densitometer ("Spectrolino" manufactured by Gretag) to measure values of OD (optical density) including the initial value thereof. The found values were introduced into the following equation to thereby obtain the relict optical density (ROD) after fading.

$$ROD\ (\%) = (D_n/D_0) \times 100$$

$D_n$: OD after exposure test (n=1 to 4)
$D_0$: OD before exposure test

An approximate curve for each image was determined by plotting the periods of exposure (number of days) as abscissa and the values of ROD as ordinate. From the approximate equation obtained, the period required for ROD to decrease to 70% was determined. Fluorescent light resistance was evaluated based on the following criteria, and the results thereof are shown in Table 3.

A: ROD does not decrease to 70% in 25 days.
B: The period required for ROD to decrease to 70% is longer than 20 days but not longer than 25 days.
C: The period required for ROD to decrease to 70% is longer than 15 days but not longer than 20 days.
D: The period required for ROD to decrease to 70% is longer than 10 days but not longer than 15 days.
E: The period required for ROD to decrease to 70% is longer than 5 days but not longer than 10 days.

TABLE 3

|  | Pure Color, OD Max | | |
| --- | --- | --- | --- |
|  | C | M | Y |
| Example 1 | A | A | A |
| Example 2 | A | B | A |
| Example 3 | C | A | B |
| Comparative Example 1 | A | D | A |

EXAMPLES 4 TO 11 AND COMPARATIVE EXAMPLE 2

[Preparation of Ink Compositions]

According to each of the formulations shown in Table 4, the ingredients were stirred together at ordinary temperature for 30 minutes. The resultant mixture was filtered through a 1-$\mu$m membrane filter. Thus, ink compositions respectively having the formulations shown in Table 4 were obtained. In Table 4, the amounts of the ingredients for each ink are given in terms of % by weight based on the overall weight of the ink.

The ink compositions shown in Table 4 are as follows. M, M1, and M2 each indicate a dark-magenta ink composition; LM, LM1, LM2, and LM3 each indicate a light-magenta ink composition; Y1 and Y2 each indicate a yellow ink composition; C1 and C2 each indicate a dark-cyan ink composition; and LC1 and LC2 each indicate a light-cyan ink composition. M and LM respectively are a dark-magenta ink composition and a light-magenta ink composition each containing a conventional magenta dye. M1, M2, LM1, LM2, and LM3 are dark-magenta and light-magenta ink compositions according to the invention each containing a compound represented by formula (1).

The colorants used in these Examples and shown in Table 4 included the following. The compound represented by formula (7), which is referred to as M dye 1, was used as an example of the compounds represented by formula (1).

The compound represented by formula (8), which is referred to as M dye 2, was used as an example of the compounds represented by formula (2).

The compound represented by formula (6), which is referred to as M dye 3, was used as an example of conventional magenta dyes.

C.I. Direct Yellow 173 and C.I. Direct Yellow 86 were used as examples of the compounds represented by formula (3) and the compounds represented by formula (4), respectively. Furthermore, C.I. Direct Blue 199 was used as an example of the compounds represented by formula (5).

Fluorescent Light Resistance Test

Fluorescent light resistance tester SFT-II (manufactured by Suga Test Instruments Co., Ltd.) was used to expose four samples of each recorded matter at an illuminance of 70,000 lx under the conditions of 24° C. and 60% RH for 7 days, 14 days, 21 days, or 28 days.

TABLE 4

|  | M | M1 | M2 | LM | LM1 | LM2 | LM3 | C1 | C2 | LC1 | LC2 | Y1 | Y2 |
|---|---|---|---|---|---|---|---|---|---|---|---|---|---|
| M dye 1 |  | 5 | 2 |  | 2 | 1.5 | 1 |  |  |  |  |  |  |
| M dye 2 | 2.5 |  | 1.5 |  |  |  |  |  |  |  |  |  |  |
| M dye 3 |  |  |  | 2 |  | 0.5 | 1 |  |  |  |  |  |  |
| C.I. Direct Blue 199 |  |  |  |  |  |  |  | 3.5 |  | 0.9 |  |  |  |
| C.I. Acid Blue 9 |  |  |  |  |  |  |  |  | 3.5 |  | 0.8 |  |  |
| C.I. Direct Yellow 86 |  |  |  |  |  |  |  |  |  |  |  | 0.8 |  |
| C.I. Direct Yellow 173 |  |  |  |  |  |  |  |  |  |  |  | 3 |  |
| C.I Acid Yellow 23 |  |  |  |  |  |  |  |  |  |  |  |  | 1.5 |
| TEGmBE | 10 | 10 | 10 | 10 | 10 | 10 | 10 | 10 | 10 | 10 | 10 | 9 |  |
| Triethylene glycol |  | 5 | 5 |  | 9 | 9 | 9 | 6 |  | 10 |  | 9 |  |
| Diethylene glycol | 9 |  |  | 10 |  |  |  |  | 10 |  | 10 |  | 10 |
| Glycerol | 10 | 10 | 10 | 10 | 10 | 10 | 10 | 10 | 10 | 10 | 10 | 10 | 10 |
| Olfin E1010 | 1.5 | 1.5 | 1.5 | 1.5 | 1.5 | 1.5 | 1.5 | 1.5 | 1.5 | 1.5 | 1.5 |  |  |
| Olfin STG |  |  |  |  |  |  |  |  |  |  |  | 0.8 | 0.8 |
| Triethanolamine | 0.6 | 0.6 | 0.6 | 0.6 | 0.6 | 0.6 | 0.6 | 0.6 | 0.6 | 0.6 | 0.6 |  | 0.6 |
| Urea | 3.5 |  |  |  |  |  |  | 2 |  | 2 |  |  |  |
| 2-Pyrrolidone |  | 3 | 3 | 2.5 | 3 | 3 | 3 | 3 |  | 3 |  |  |  |
| Benzotriazol | 0.01 | 0.01 | 0.01 | 0.01 | 0.01 | 0.01 | 0.01 | 0.01 | 0.01 | 0.01 | 0.01 | 0.01 | 0.01 |
| Proxel XL-2 | 0.3 | 0.3 | 0.3 | 0.3 | 0.3 | 0.3 | 0.3 | 0.3 | 0.3 | 0.3 | 0.3 | 0.3 | 0.3 |
| EDTA | 0.02 | 0.02 | 0.02 | 0.02 | 0.02 | 0.02 | 0.02 | 0.02 | 0.02 | 0.02 | 0.02 | 0.02 | 0.02 |
| Ultrapure water | bal. | bal. | bal. | bal. | bal. | bal. | bal. | bal. | bal. | bal. | bal. | bal. | bal. |

[Production of Printed Matter]

Subsequently, the inks obtained were used as ink sets according to the respective ink combinations shown in Table 5. These ink sets were filled in cartridges for exclusive use in ink-jet printer PM800C (manufactured by Seiko Epson Corp.) to conduct printing with the printer on a recording medium for exclusive use in ink-jet printing (PM Photographic Paper; manufactured by Seiko Epson Corp.). Thus, recorded matters of two kinds were produced, i.e., color patches which were to be subjected to the light resistance evaluation of the yellow ink, light-magenta ink, and light-cyan ink and which bore a yellow image (Y image 1), magenta image (M image 1), and cyan image (C image 1) each printed so as to have an OD value in the range of from 0.9 to 1.1; and color patches which were to be subjected to a test for evaluating the light resistance of the yellow ink, dark-magenta ink, and dark-cyan ink and which bore a yellow image (Y image 2), magenta image (M image 2), and cyan image (C image 2) each printed so as to have a maximum color density.

TABLE 5

|  | M | LM | C | LC | Y |
|---|---|---|---|---|---|
| Example 4 | M1 | LM1 | C1 | LC1 | Y1 |
| Example 5 | M2 | LM1 | C1 | LC1 | Y1 |
| Example 6 | M | LM1 | C1 | LC1 | Y1 |
| Example 7 | M1 | LM2 | C1 | LC1 | Y1 |
| Example 8 | M2 | LM2 | C1 | LC1 | Y1 |
| Example 9 | M | LM2 | C1 | LC1 | Y1 |
| Example 10 | M1 | LM3 | C1 | LC1 | Y1 |
| Example 11 | M1 | LM1 | C2 | LC2 | Y2 |
| Comparative Example 2 | M | LM | C1 | LC1 | Y1 |

With respect to each ink set, the two kinds of color patches as described above were produced and subjected to a fluorescent light resistance test.

Light Resistance of Yellow Ink Composition, Light-Magenta Ink Composition, and Light-Cyan Ink Composition and Light Resistance Life of Ink Set Five samples of each color patch bearing a yellow image (Y image 1), magenta image (M image 1), and cyan image (C image 1) each printed so as to have an OD value in the range of from 0.9 to 1.1 were examined with a reflection densitometer ("Spectrolino" manufactured by Gretag) to measure values of OD (optical density) including the initial value thereof. The found values were introduced into the following equation to thereby obtain the relict optical density (ROD) after fading.

$$ROD\ (\%) = (D_n/D_0) \times 100$$

$D_n$: OD after exposure test (n=1 to 4)

$D_0$: OD before exposure test

An approximate curve for each image was determined by plotting the periods of exposure (number of days) as abscissa and the values of ROD as ordinate. From the approximate equation obtained, the period required for ROD to decrease to 70% was determined. Fluorescent light resistance was evaluated based on the following criteria, and the results thereof are shown in Table 6. The rating which governed the life of each ink set (the rating of the image having lowest light resistance) was taken as the light resistance life of the ink set.

A: ROD does not decrease to 70% in 25 days.

B: The period required for ROD to decrease to 70% is longer than 20 days but not longer than 25 days.

C: The period required for ROD to decrease to 70% is longer than 15 days but not longer than 20 days.

D: The period required for ROD to decrease to 70% is longer than 10 days but not longer than 15 days.

E: The period required for ROD to decrease to 70% is longer than 5 days but not longer than 10 days.

TABLE 6

| | Pure Color, OD 1.0 | | | |
| --- | --- | --- | --- | --- |
| | C | M | Y | Life |
| Example 4 | A | A | A | A |
| Example 5 | A | A | A | A |
| Example 6 | A | A | A | A |
| Example 7 | A | B | A | B |
| Example 8 | A | B | A | B |
| Example 9 | A | B | A | B |
| Example 10 | A | C | A | C |
| Example 11 | D | A | E | E |
| Comparative Example 2 | A | E | A | E |

Light Resistance of Yellow Ink, Dark-Magenta Ink, and Dark-Cyan Ink

Five samples of each color patch bearing a yellow image (Y image 2), magenta image (M image 2), and cyan image (C image 2) each printed so as to have a maximum color density were examined with a reflection densitometer ("Spectrolino" manufactured by Gretag) to measure values of OD (optical density) including the initial value thereof. The found values were introduced into the following equation to thereby obtain the relict optical density (ROD) after fading.

$$ROD\ (\%) = (D_n/D_0) \times 100$$

$D_n$: OD after exposure test (n=1 to 4)

$D_0$: OD before exposure test

An approximate curve for each image was determined by plotting the periods of exposure (number of days) as abscissa and the values of ROD as ordinate. From the approximate equation obtained, the period required for ROD to decrease to 70% was determined. Fluorescent light resistance was evaluated based on the following criteria, and the results thereof are shown in Table 7.

A: ROD does not decrease to 70% in 25 days.

B: The period required for ROD to decrease to 70% is longer than 20 days but not longer than 25 days.

C: The period required for ROD to decrease to 70% is longer than 15 days but not longer than 20 days.

D: The period required for ROD to decrease to 70% is longer than 10 days but not longer than 15 days.

E: The period required for ROD to decrease to 70% is longer than 5 days but not longer than 10 days.

TABLE 7

| | Pure Color, OD Max | | |
| --- | --- | --- | --- |
| | C | M | Y |
| Example 4 | A | A | A |
| Example 5 | A | B | A |
| Example 6 | A | D | A |
| Example 7 | A | A | A |
| Example 8 | A | B | A |
| Example 9 | A | D | A |
| Example 10 | A | A | A |
| Example 11 | C | A | D |
| Comparative Example 2 | D | A | E |

The ink set according to the first aspect of the invention, which comprises a yellow ink composition, a magenta ink composition, and a cyan ink composition, produces an excellent effect that it can give images having improved light resistance and a prolonged light resistance life, because the magenta ink composition contains as a colorant at least one member selected from compounds represented by formula (1) and salts thereof.

The ink set according to the second aspect of the invention produces an excellent effect that it can give images having improved light resistance and a prolonged light resistance life, because at least the light-magenta ink composition included therein contains as a colorant at least one member selected from compounds represented by formula (1) and salts thereof. Furthermore, when the dark-magenta ink composition, which is included in this ink set in combination with the light-magenta ink composition, contains at least one member selected from compounds represented by formula (1), salts thereof, and compounds represented by formula (2), then this ink set produces an excellent effect that the images formed therewith can have further improved light resistance.

While the invention has been described in detail and with reference to specific embodiments thereof, it will be apparent to one skilled in the art that various changes and modifications can be made therein without departing from the spirit and scope thereof.

The invention is based on Japanese Patent Application Nos. 2002-120069 (filed Apr. 23, 2002), 2002-120070 (filed Apr. 23, 2002), and 2003-109994 (filed Apr. 15, 2003), the contents thereof being herein incorporated by reference.

What is claimed is:

1. An ink set comprising a yellow ink composition, a magenta ink composition, and a cyan ink composition, wherein the magenta ink composition contains as a colorant at least one member selected from compounds represented by the following formula (1) and salts thereof:

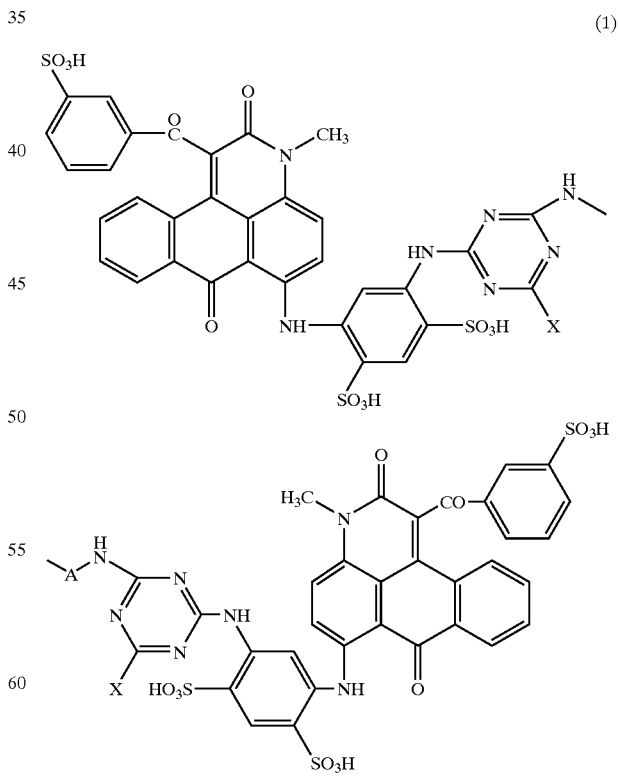

wherein A represents an alkylene group, an alkylene group having a phenylene group, or a group represented by

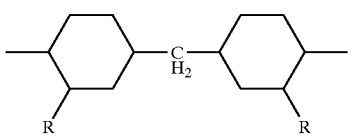

wherein R means a hydrogen atom or an alkyl group, and X represents $NH_2$, OH or Cl.

2. The ink set of claim 1, wherein the magenta ink composition contains as a colorant the at least one member selected from compounds represented by formula (1) and salts thereof in a total amount of from 1.0 to 10% by weight based on the overall weight of the magenta ink composition.

3. An ink set comprising two magenta ink compositions differing in color density, wherein the magenta ink composition having a lower color density contains as a colorant at least one member selected from compounds represented by the following formula (1) and salts thereof:

(1)

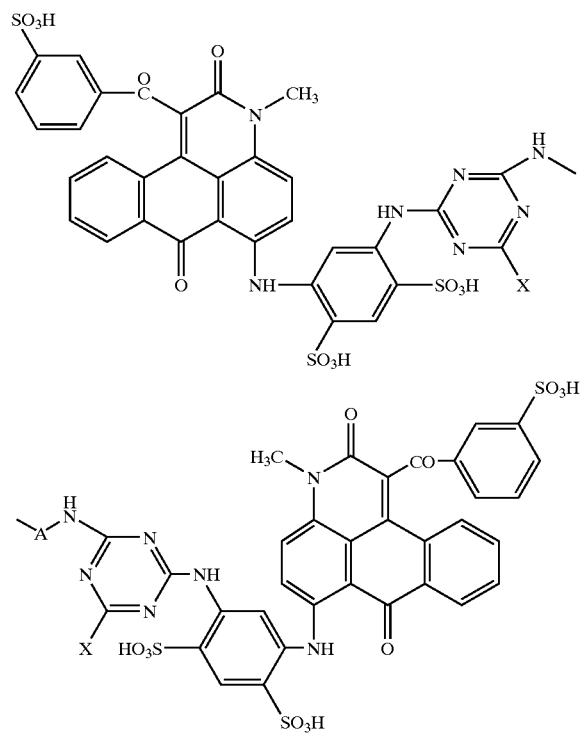

wherein A represents an alkylene group, an alkylene group having a phenylene group, or a group represented by

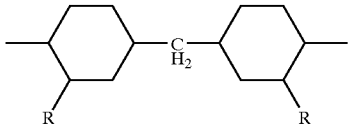

wherein R means a hydrogen atom or an alkyl group, and X represents $NH_2$, OH or Cl.

4. The ink set of claim 3, wherein the magenta ink composition having a lower color density contains as a colorant the at least one member selected from compounds represented by formula (1) and salts thereof in a total amount of from 0.5 to 3.5% by weight based on the overall weight of the magenta ink composition having a lower color density.

5. The ink set of claim 3, wherein the magenta ink composition having a higher color density contains as a colorant at least one member selected from compounds represented by formula (1), salts thereof, and compounds represented by the following formula (2):

(2)

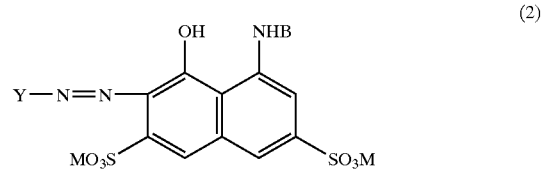

wherein Y represents a $C_1$–$C_4$ alkyl group, an alkoxy group, a phenyl group substituted with OH, $SO_3H$ or COOM, or a naphthyl group; B represents H or the following formula:

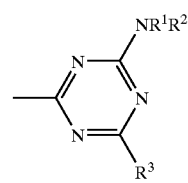

wherein $R^1$ represents H, OH, or a $C_1$–$C_4$ alkyl group substituted with COOH, $R^2$ represents a $C_1$–$C_4$ alkyl or phenyl group substituted with OH, $OCH_3$, $OC_2H_5$, $SO_3M$ or COOM, and $R^3$ represents OH, COOH or $NHR^4$, wherein $R^4$ represents $SO_3M$ or a $C_1$–$C_4$ alkyl group substituted with COOH; and M represents H, Li, Na, K, ammonium or an organic amine.

6. The ink set of claim 5, wherein the magenta ink composition having a higher color density contains as a colorant the at least one member selected from compounds represented by formula (1), salts thereof, and compounds represented by formula (2) in a total amount of from 1 to 10% by weight based on the overall weight of the magenta ink composition having a higher color density.

7. The ink set of claim 3, which includes a yellow ink composition and a cyan ink composition.

8. The ink set of claim 3, which includes a yellow ink composition and two cyan ink compositions differing in color density.

9. The ink set of any one of claims 1, 7 and 8, wherein the yellow ink composition contains as a colorant at least one member selected from compounds represented by the following formula (3) and compounds represented by the following formula (4):

(3)

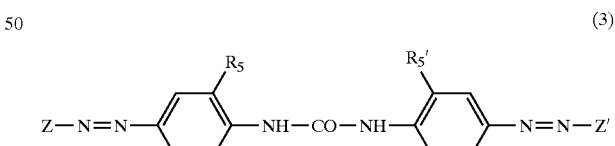

(4)

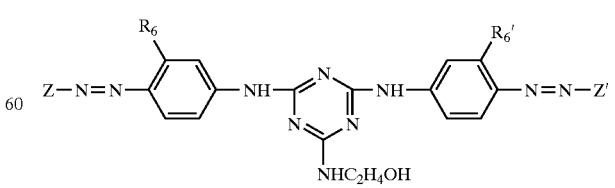

wherein $R_5$, $R_5'$, $R_6$, and $R_6'$ each independently represent $CH_3$ or $OCH_3$, and Z and Z' may be the same or different and each independently have any of the following structures:

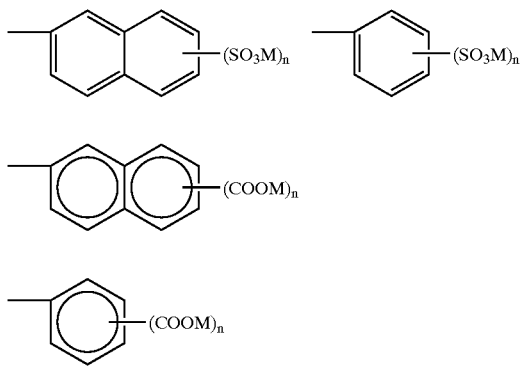

wherein M represents H, Li, Na, K, ammonium or an organic amine, and n is an integer of 1 or 2.

10. The ink set of claim 9, wherein the yellow ink composition contains as a colorant the at least one member selected from compounds represented by formula (3) and compounds represented by formula (4) in a total amount of from 1 to 6% by weight based on the overall weight of the yellow ink composition.

11. The ink set of claim 8, wherein the cyan ink composition having a higher color density, of the two cyan ink compositions differing in color density, contains as a colorant at least one member selected from compounds represented by the following formula (5):

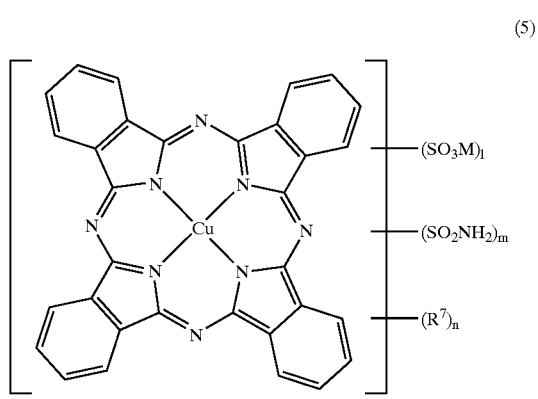

wherein $R^7$ represents OH or COOH; M represents H, Li, Na, K, an ammonium group or an organic amine; and l, m and n each are from 0 to 4, provided that (l+m+n)=4.

12. The ink set of claim 8 or 11, wherein the cyan ink composition having a lower color density, of the two cyan ink compositions differing in color density, contains as a colorant at least one member selected from compounds represented by the following formula (5):

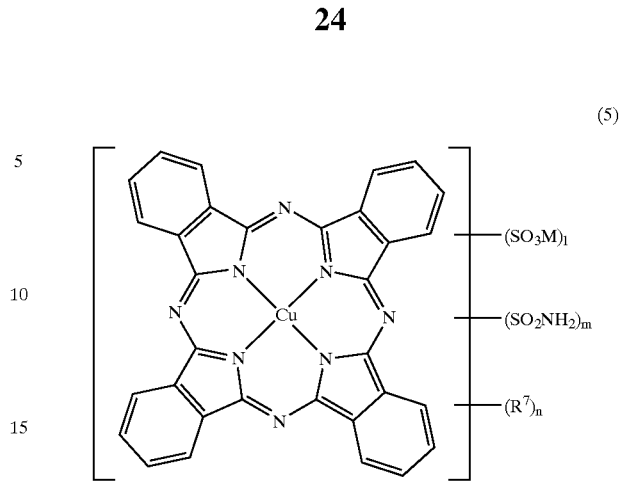

wherein $R^7$ represents OH or COOH; M represents H, Li, Na, K, an ammonium group or an organic amine; and l, m and n each are from 0 to 4, provided that (l+m+n)=4.

13. The ink set of claim 12, wherein the cyan ink composition having a higher color density contains the at least one member selected from compounds represented by formula (5) as a colorant in a total amount of from 2.0 to 6.0% by weight based on the overall weight of the cyan ink composition having a higher color density, and the cyan ink composition having a lower color density contains the at least one member selected from compounds represented by formula (5) as a colorant in a total amount of from 0.4 to 3.0% by weight based on the overall weight of the cyan ink composition having a lower color density.

14. The ink set of claim 1, wherein the cyan ink composition contains as a colorant at least one member selected from compounds represented by the following formula (5) in a total amount of from 2.0 to 6.0% by weight:

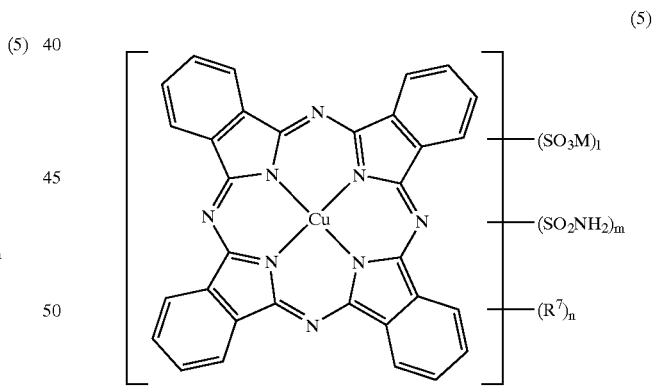

wherein $R^7$ represents OH or COOH; M represents H, Li, Na, K, an ammonium group or an organic amine; and l, m and n each are from 0 to 4, provided that (l+m+n)=4.

15. The ink set of claim 1 or 3, which includes a black ink composition.

16. The ink set of claim 1 or 3, wherein the ink compositions contain a nonionic surfactant.

17. The ink set of claim 16, wherein the nonionic surfactant is an acetylene glycol-based surfactant.

18. The ink set of claim 16, wherein each ink composition contains the nonionic surfactant in an amount of from 0.1 to 5% by weight based on the overall weight of the ink composition.

19. The ink set of claim 1 or 3, wherein the ink compositions contain a penetration accelerator.

20. The ink set of claim 19, wherein the penetration accelerator is a glycol ether.

21. An ink cartridge housing an ink set of claim 1 or 3 either integrally or independently.

22. An ink-jet recording process comprising conducting recording with an ink set of claim 1 or 3.

23. An ink-jet recording process comprising conducting recording with an ink cartridge of claim 21.

24. Recorded matter obtained by recording with an ink set of claim 1 or 3.

25. Recorded matter obtained by recording with an ink cartridge of claim 21.

* * * * *